Oct. 7, 1958

F. PIERCE ET AL 2,854,764

ECHO-RANGING GEAR TRAINING DEVICE

Filed May 16, 1944

Inventor
FIRTH PIERCE – GEORGE A. BRETTELL JR.
MELVIN O. KAPPLER – CLARK F. BRADLEY Attorney Oct. 7, 1958    F. PIERCE ET AL    2,854,764
ECHO-RANGING GEAR TRAINING DEVICE
Filed May 16, 1944    3 Sheets-Sheet 2

Inventor
FIRTH PIERCE — GEORGE A. BRETTELL JR.
MELVIN O. KAPPLER — CLARK F. BRADLEY By
Attorney

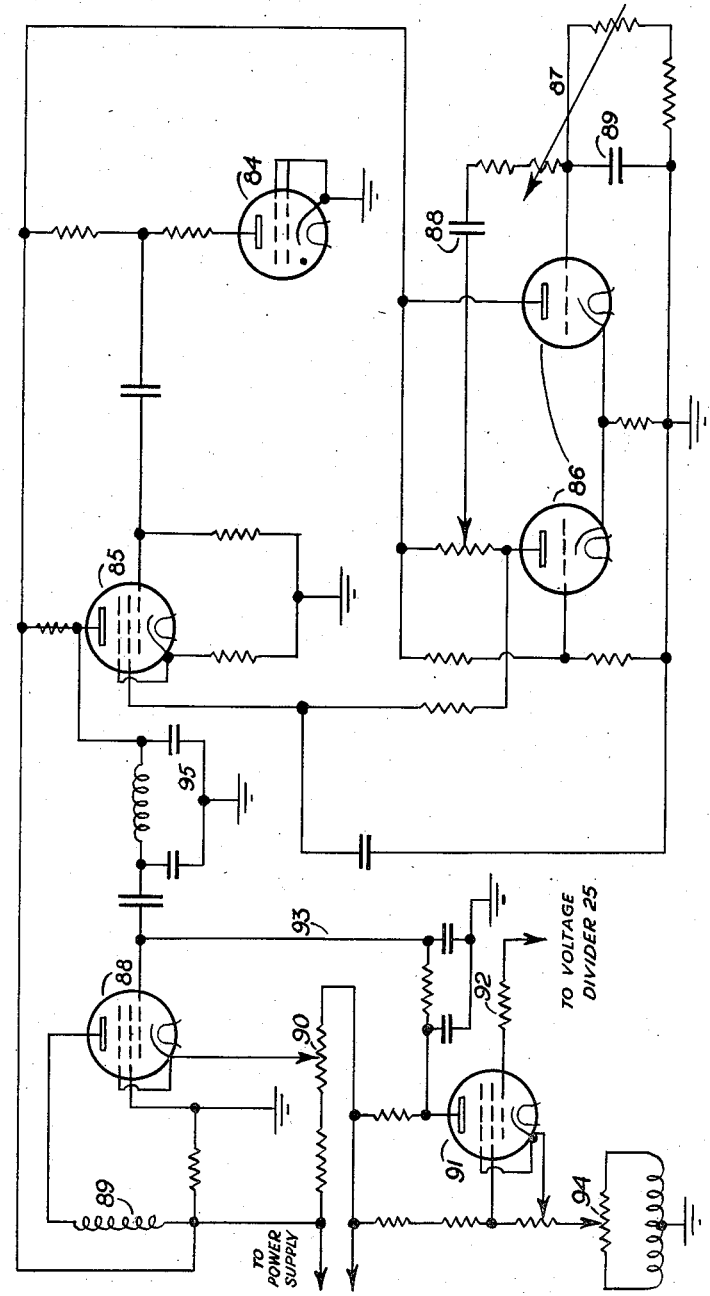

United States Patent Office 2,854,764
Patented Oct. 7, 1958

2,854,764

ECHO-RANGING GEAR TRAINING DEVICE

Firth Pierce, George A. Brettell, Jr., Melvin O. Kappler, and Clark F. Bradley, San Diego, Calif., assignors to the United States of America as represented by the Secretary of the Navy Application May 16, 1944, Serial No. 535,858

15 Claims. (Cl. 35—10.4)

This invention relates to a training device for underwater sound-gear operators.

In time of peace or war it proves necessary to provide constant training of operators in the use of echo-ranging gear used on both war and merchant ships. As is generally known, this gear consists of a hydrophone and a projector (which may be a common unit), a transmitter, a receiver, and the various associated and incidental circuits. The principle of operation is very simple: a sound signal is radiated into the water by means of the projector and any returning echo indicates the presence of a "target," at some bearing and range. The range is obviously determinable from the time intervening between the transmission of the signal and the receipt of the echo, the velocity of sound in the water being known. The bearing of the target generally is more difficult to determine and several methods have been utilized to obtain it. The one most commonly used involves a directional transducer by means of which the bearing, as indicated on a projector-training dial, is determined by rotation of the projector-training mechanism until the echo exhibits its greatest intensity. In this method, it is then common to train the transducers back and forth across the azimuth of the target to determine the "cut-off" and "cut-on" points (i. e., the ends) of the target.

It is obvious, however, that regardless of the type of gear or searching method used, the success of the operation depends upon the skill of the operator. Elaborate methods have been used to train operators in recognizing various kinds of targets and water conditions, and one of the objects of the present invention is a simple device to accomplish this purpose.

During the long periods at sea, operators are very likely to lose considerable of the skill which they have acquired, because not targets are available with which they may practice echo-ranging. It is thus another object of the invention to provide a device, which, when attached to existing sound-ranging gear, simulates the echoes produced by a target. It is therefore possible to practice echo-ranging procedure when no targets are available. In this connection, it should be also noted that such unavailability of targets may be caused by a shortage of ships, submarines, and equipment for training purposes, as well as for the reason noted above.

It is an important object of the invention to enable operators to keep in practice by providing a device as an auxiliary to the existing gear, which enables the operator to practice the searching procedure and to receive simulated echoes. The existing echo-ranging gear is altered in no respect, except that provision is made to connect the invention to it so that when the operator searches a given range and bearing, as determined by the setting of the controls, the invention introduces a simulated echo into the receiver of the echo-ranging gear. It is important to note that normal operation is not interfered with during this practice and that the gear is actually operating in normal fashion all during the practice period. Actual targets, if present, will be normally indicated, but additionally, the invention introduces the simulated echo.

The invention also provides (1) means for automatically changing the time at which the simulated echo is introduced, to simulate the closing of the range between the target and the searching ship, (2) means for manually changing the rate of such range change, (3) means for varying the pitch, duration and amplitude of the simulated echo to represent the actual changes caused by searching, varying water conditions, the Doppler effect, etc., (4) means for attenuating the echo, as the projector is trained away from the target's bearing, and (5) means for increasing the angle intercepted by the target as the range closes.

Additionally, if desired, the invention can be made to include means for simulating the sound of a ship's or submarine's screws.

Because the invention is most likely to be used aboard ships where space may be very much at a premium, it is of great convenience that the device be made compact and sturdy. However, as will be seen, its physical form can be varied, all of which is not important to its actual operation. For this reason, primary consideration is given to the circuits by means of which the invention is accomplished.

It may thus be stated that the invention provides means for introducing simulated echoes into the receiving system of conventional echo-ranging gear, which simulated echoes may be controlled to exhibit the characteristics of echoes received from actual targets. It is designed for attachment to the existing gear (and controllable by an instructor) in order that an operator may be trained in the searching procedure by operating the existing echo-ranging gear.

In the drawings:

Figure 5 is a schematic diagram of an electrical circuit for simulating screw noises which may be used with the invention.

Figure 4:
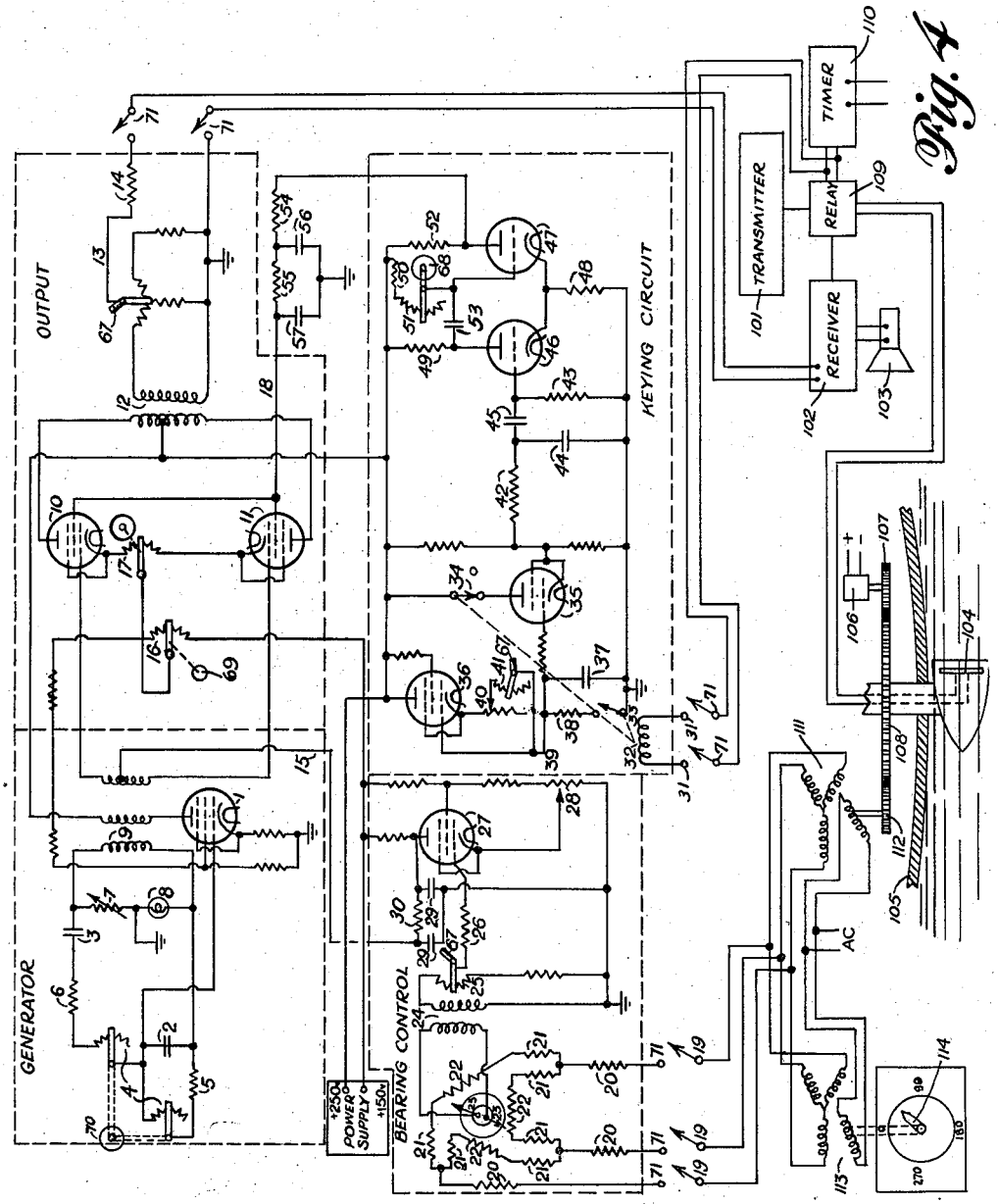
Figure 4 is a schematic diagram of the electrical circuits used with the invention.

The circuit may be conveniently divided into the four sections enclosed in the dotted boxes shown in Fig. 4. These are: (1) the generator section, (2) the bearing control section, (3) the keying circuit section, and (4) the output section. The various sections may be supplied from a common regulated power supply of any conventional type, which compensates for irregularities in the available supply, to furnish a constant voltage source.

In general, as has been stated, the invention is principally designed for use with existing echo-ranging gear of the type which periodically transmits a series of short signals, called "pings," into the water. The gear may include a transmitter oscillator 101 generating an output at supersonic frequency, a receiver 102, the audio output of which is connected to a loudspeaker 103, a transducer 104 projecting down into the water through the hull 105 of a vessel, a reversible motor 106 under control of an operator for training the transducer 104 in azimuth in either direction of rotation, the motor being connected to drive the transducer by means of a pinion 107 meshed with gear 108, a periodically operated relay 109 for alternately connecting the transducer 104 with the transmitter 101 and receiver 102, and a timer 110 for controlling the periodic operation of relay 109. In operation, each time that relay 109 is energized, the supersonic frequency output from transmitter 101 is connected for a relatively short period to transducer 104 to thereby emit a pulse or ping of compressional wave energy into the surrounding water medium. The transducer 104 is of such construction that the wave energy pulse is projected in a "beam," the polar diagram of which is a relatively narrow lobe with its axis substantially perpendicular to the plane of the transducer's radiating face. Consequently the sound operator through control of the reversible motor 106 determines the bearing at which the pulse is projected. When relay 109 becomes deenergized, transmission of the pulse ceases, transducer 104 is then connected to the receiver 102 by the relay 109, and the operator then listens for an echo of the transmitted pulse from any underwater target which may be present within range of the system. The operation by which the individual ping is transmitted is called "keying." This keying operation is also utilized to operate an additional relay contained within the invention. After a time determined by the circuits and the setting of the various controls on the invention, a signal, simulating the signal produced by a real target, may be introduced into the audio system of the echo-ranging gear, depending upon whether or not the operator is training the echo-ranging gear in a direction corresponding to the settings of the target bearing dial on the invention. Also, the characteristics of the simulated echo signal will be determined by the invention in a manner consistent with signals obtained from actual targets.

Generator section

The simulated echo signal is developed in a resistance-capacitance stabilized oscillator 1, shown in Fig. 4. The frequency of the oscillator is determined by the RC circuit comprising capacitors 2, 3 and a dual potentiometer 4. Resistors 5, 6 serve only to limit the upper frequency obtainable. These elements, together with adjustable resistor 7 and thermistor 8, form a Wien bridge. The ratio of resistor 7 to the resistance of thermistor 8 determines the transmission at the "resonant" frequency. Since an increase in level causes the resistance of the thermistor to increase and therefore the output of the bridge to decrease, it is evident that the action of the thermistor is to regulate the amplitude of the oscillation. The adjustable feature of resistor 7 serves to establish this automatically maintained amplitude.

This output transformer 9 is provided with two secondary windings: one excites the Wien bridge, the other constitutes part of a push-pull output circuit.

Output section

The push-pull signal derived from the generator described above is applied to the control grids of the balanced modulator tubes 10, 11. The plates of these tubes drive the output circuit consisting of transformer 12, attenuator 13 and isolating resistor 14. This output circuit is connected to supply the audio stages of the echo-ranging gear's receiver, whose output in turn is normally available in a loudspeaker or headphones.

The gain of the modulator stage is governed by the control grid bias supplied by conductor 15. The gain is also affected by amplitude control 16 which acts chiefly as a self-bias resistor. Adjustable voltage divider 17 serves to balance the modulator against relative deviation of the characteristics of tubes 10, 11. The screen grids of these tubes are externally available through conductor 18, whose function is to supply a keying pulse; if the potential of conductor 18 is negative with respect to the cathodes of tubes 10, 11, no transmission results. If the potential of conductor 18 approaches that of the plates of tubes 10, 11, transmission occurs, the strength of which is governed by the previously described amplitude control 16 and the potential of the grid bias conductor 15.

Bearing control section

The bearing control section which determines the direction or bearing from which a simulated echo will be produced is supplied at terminals 19. Several different arrangements are satisfactory for this purpose, although the one shown in Fig. 4 has been found very satisfactory.

For proper operation of the invention it is desirable to have some control means which will operate with the self-synchronous motion transmission system present in the echo-ranging gear. One such system known under the trade-mark "Selsyn" ordinarily consists of a transmitting Selsyn 111, the rotor of which is geared for 1 to 1 rotation with gear 108 by means of gear 112, and which supplies three alternating voltages to a receiving Selsyn 113, which drives the projector-training indicator 114 on the front panel of the gear. Thus, since the Selsyns make one revolution as the training mechanism makes one revolution, it is apparent that for any given direction of training, the wires between the transmitting and receiving Selsyns carry information, determined by the particular direction in which the projector mechanism is trained.

Since it is desirable to introduce a signal into the echo-ranging gear at a particular bearing which may be determined by operation of the invention, this Selsyn system provides a convenient source of information for determining when such signals shall be introduced.

It can be shown that if connection is made between the Selsyn wires to equally spaced points on a ring potentiometer, there will be two sets of opposite (180°) points on the potentiometer which are of equal potential, and thus provide a null point for voltage measurements made at such opposite points on the ring. Thus, if a rigid arm, with a contact at each of its ends for measuring the voltages on opposite points on the potentiometer, is rotated, there will be two particular positions where no potential will exist between the contacts. If desirable, means can be provided to eliminate one of these null positions, but the false null point which occurs at 180° away, relative to the desired null point, is not troublesome in practice.

In the invention as shown in Fig. 4, the Selsyn voltages available at terminals 19 are supplied through multiplier resistors 20 and corrective resistors 21 to ring potentiometer 22 (whose physical position in the invention will be subsequently described). Rotating arms 23 are used to determine the potential on points 180° apart on the potentiometer, as described. In the invention, this output voltage is applied through transformer 24, voltage divider 25 and isolating resistor 26 to the grid of tube 27. This tube acts as a delayed type rectifier, where the delay is controllable by the initial bias supplied by potentiometer 28. The output of tube 27 supplies grid bias through conductor 15 to the previously described modulator tubes 10, 11. A hum-filter comprising condensers 29 and resistor 30 is inserted between tube 27 and conductor 15.

Arm 23 on the ring potentiometer is connected for rotation to an adjustable target bearing bug dial on the face of the invention, which will be subsequently described. Since the output section is controlled through tube 27, whose bias is determined by the voltage across the arms 23, it is easily seen that when the arms are set in a predetermined position, only when the wires of the Selsyn system are supplying voltages (as determined by the direction of projector-training) such that substantially no voltage appears across the arms 23, will the bearing control circuit effect the modulators 10, 11 to supply a signal to the audio section of the receiver of the echo-ranging gear.

This is necessarily true since only when the arms 23 are resting on such a null point in the Selsyn system, will no current flow in tube 27 and a maximum potential is applied to tubes 10, 11. As this null angle is departed from, at first no effects are observed because of the delay introduced by potentiometer 28. For still further departures of arm 23 from the null angle, tube 27 will begin to pass current, the potential of conductor 15 falls, and the transmission of the balanced modulator is decreased until finally, as the angular position of arms 23 is still further increased, the transmission of the modulators goes to zero.

The operation of potentiometer 22 corresponds to the changing bearing of the target relative to the searching ship in echo-ranging procedure and the above described action simulates the off-target attenuation effects found in actual echo-ranging gear. The previously mentioned delay is employed to correctly shape one aspect of the effective lobe pattern of this arrangement. A second aspect, the effective broadness of this lobe is controlled by the previously mentioned potentiometer 25.

As an alternative to the use of a ring potentiometer, a device, which might be called a control transformer, could also be utilized. For the purposes of this specification, the physical form of the control transformer would be identical to that of a conventional Selsyn; but the connection and use of it would be different. The control transformer would be provided with a three-phase winding and a single-phase winding and would be further provided with mechanical means for altering the relation between the two. In its use in this invention, the three terminals of the three-phase winding would be connected to the multiplying resistors 20 and the single-phase winding would be connected to the transformer 24, and the mechanical means connected (as are arms 23) to the target bearing dial.

The current supplied through terminals 19 would cause an alternating field to be established within the device, whose spatial alignment corresponds to the training of the projector. A null at the output terminals would exist when the axis of the single-phase winding was perpendicular to this alternating field. The effects obtained would be identical to those obtained with the ring potentiometer except that the latter's inherent racking errors would be absent.

*The keying circuit section*

In order to complete the simulation of the echo from an actual target, it is necessary to properly key the modulator stage by means of a signal applied to the previously mentioned conductor 18. The simulated echo signal must occur at the proper time after the outgoing signal or ping of the associated echo-ranging equipment, and further, must be of proper duration. Information concerning the time of the outgoing ping is supplied from the previously described keying operation in the echo-ranging gear to terminals 31 in the form of a short pulse of A. C. which exists only during the period of the outgoing ping. This pulse operates relay 32 which is provided with normally open contacts 33 and normally closed contacts 34. The delay portion of the keying circuit has for its tube complement thyratron 35 and impedance multiplying tube 36. When relay 32 is operated, condenser 37 is discharged to essentially zero voltage through peak-current limiting resistor 38 and contact 33. Tube 35 is extinguished by virtue of the opening of its plate circuit by contacts 34. Under these conditions, a current flows through conductor 39 which is determined by variable resistor 40, 41 and the parameters of tube 36. Essentially, the action of tube 36 can be described as one of multiplying the effective ohmic value of these resistors; by its use, excessively large values for the resistors are avoided.

As relay 32 is released, condenser 37 starts to charge at a rate determined by the charging current in conductor 39. This action proceeds until the grid of tube 35 becomes sufficiently positive with respect to ground so that tube 35 fires.

Tube 35 will continue to conduct until contacts 34 open.

At the time of firing, the cathode of tube 35 jumps suddenly positive due to the trigger action of the tube's gas content. This sudden rise is suitably shaped by the network comprising resistors 42, 43 and condensers 44, 45 so that a pulse is available which occurs a controllable time after the release of relay 32. This delay corresponds to the delay between ping and echo (which delay measures the range of the target in normal echo-ranging procedure), and is controlled by the value of resistors 40, 41.

The keying pulse is supplied by a single pulse multivibrator, comprising tubes 46, 47, resistors 48, 49, 50, 51, 52, and condenser 53. In the standby condition, a small current flows through resistors 50, 51 to the grid of tube 47, which assures that zero bias exists on tube 47. A maximum plate current therefore flows through resistors 52, 48. The resultant potential drop across resistor 48 is sufficient to bias tube 46 beyond cut-off, since the grid of tube 46 is returned to ground through resistor 43. Under these conditions, zero potential drop exists across resistor 49. On the occasion of a positive pulse being applied to the grid of tube 46, plate current will flow through resistor 49, and the plate of tube 46 will start to drop in potential. This potential drop will be applied through condenser 53 to the grid of tube 47 and thus will act to decrease the plate current in tube 47 and therefore decrease the potential drop across resistor 48, and, in effect, make the grid of tube 46 go still further positive with respect to its cathode. This self-accelerating action will continue until tube 47 is completely cut off. A new equilibrium will be established wherein tube 46 is carrying finite current with zero externally applied grid potential and the plate of tube 47 is at its maximum positive value. During this period condenser 53 is being slowly charged by the current through resistors 50, 51. This state of affairs continues until the charge on condenser 53 has been raised sufficiently for the grid of tube 47 to allow plate current to flow. The action is now self-accelerating in the opposite sense until the original stand-by condition obtains. Therefore, the incident of an input positive pulse causes an output impulse of duration controlled by the charging time of condenser 53. This charging time is in turn controlled by the value of resistors 50, 51.

The keying pulse just described is supplied through conductor 18 to the modulator stage through the network comprising resistors 54, 55 and condensers 56, 57. The function of this network is to take the high-frequency components out of the onset and decay of the keying pulse applied to the modulator and thus avoid the presence of "keying clicks" in the simulated echo signal.

*Operation of the circuits*

The specific operation of the circuit elements has been described above but it is well to consider the circuit as a whole. The generator circuit supplies a signal to the output stage at all times, but whether or not it is passed by the modulator stage to the audio stage of the echo-ranging gear is determined by the setting of the variable controls.

When a ping is transmitted by the echo-ranging gear, relay 32 is caused to be energized for the period of the ping to close contact 33 and open contact 34 for such period. Assuming that arms 23 on potentiometer 22 are set at a null point so that no output voltage is supplied to transformer 24 and no current flows through tube 27 (as has been described), the maximum positive potential is applied to the grids of modulator tubes 10, 11. Thus, the output circuit will supply a maximum signal (simulated echo) to the audio stage of the echo-ranging gear, if the control exerted by conductor 18 does not prevent such operation. Thus, if the keying circuit exerts no control, the simulated echo will be transmitted to the gear's audio stage at all times when the potentiometer arms 23 are established at a null position.

However, as has also been described; when relay 32 is energized by the ping of the echo-ranging gear, condenser 37 is discharged and tube 35 is extinguished. At the end of the ping, relay 32 returns to its normal position with contacts 33 open and contacts 34 closed. Condenser 37 begins to charge and continues to do so until tube 35 fires, the time being determined by the values of resistors 41, 42, and corresponding to the echo delay time found in sound gear operation.

The firing of tube 35 supplies a pulse to the multivibrator 46, 47 which in turn supplies a pulse to conductor 18. This raises the potential of the grids of the modulator tubes 10, 11, and allows transmission of the signal produced by the generator section to the audio stage of the echo-ranging gear at a given time after relay 32 was originally actuated by the ping of the echo-ranging gear.

In the above assumption, arms 23 on potentiometer 22 were in the null position and it was seen that the signal produced by the generator section was supplied to the audio stage of the echo-ranging gear at a given time after the pinging and actuation of relay 32. If the remainder of the circuit is unchanged, and arms 23 are moved to another position (not a null), current of an amount proportional to the change in position will flow in tube 27 and thus a lesser positive potential will be applied to the modulator tubes and the intensity of the generated signal will be considerably lessened as it appears at the audio terminals. In other words, the intensity of such signal (or simulated echo) is inversely proportional to the angular displacement of arms 23 from a null point.

*Operation of the equipment*

Since it is most desirable to have the echo signal simulate as nearly as possible the echo produced by an actual target which moves relative to the searching ship, provision must be made to accomplish an effective change in bearing of the target with respect to the ship (and a lessening of the intensity of the echo as the projector is swept across and away from the target); a change in range (as evidenced by varying the time between the occurrence of the ping and the observation of the echo signal); a varying rate of such change (as would be observed for varying speeds of the target relative to the searching ship); and an effective increase in target bearing width as the range decreases.

It has been found convenient to make the change in bearing and change in range rate a manual operation, controllable on the face of the equipment by an instructor, while the range change and attenuation, as the projector is swept away from the target bearing, are made automatic.

Figure 1:
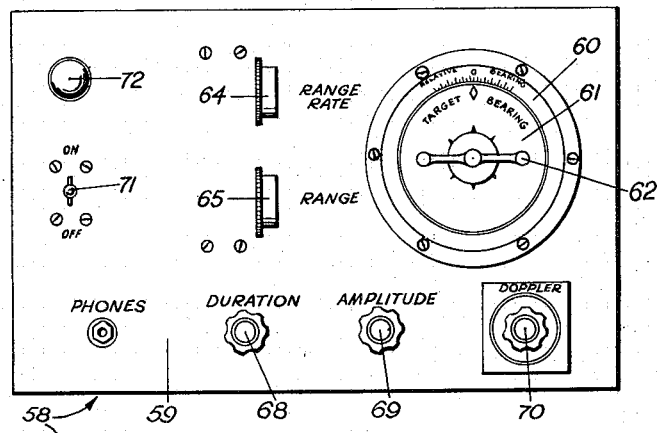
Figure 1 is a view of the front panel of the invention, showing the position of the control dials in one form of the invention.
Figure 2:
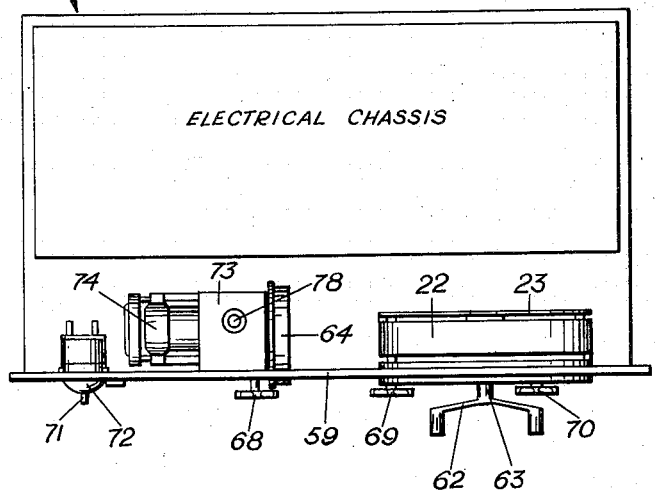
Figure 2 is a diagrammatic view showing the relative arrangement of parts in one form of the invention.

This is accomplished by arranging the circuits in a convenient rack or case, provided with controls, as shown in Figs. 1 and 2. The particular arrangement of the elements is a matter of convenience and may be accomplished in any desired manner. The particular one shown comprises a metal case 58, having a front panel 59 in which the several controls are mounted.

As shown in Fig. 1, the main bearing control comprises a stationary dial 60, divided into 360°, a rotatable target bearing bug dial 61, rigidly attached with a turning crank 62 to a shaft 63, extending through the panel 59. Two additional dials, a range rate dial 64 and a range dial 65, are mounted on shafts 66, 67, respectively, extending parallel to the panel 59. Three control knobs 68, 69, 70, used to vary the duration, amplitude and frequency (Doppler), respectively, of the simulated echo signal are also mounted on panel 59.

A cam-lever switch 71 is likewise mounted on the front panel, together with a pilot light 72, which is connected to indicate when the switch is in the "on" position. As will be obvious to those skilled in the art, this single switch, as shown in Fig. 4, may be utilized to disconnect all terminals leading to the echo-ranging gear.

It has been found very convenient to construct a potentiometer in the form of a ring for use as potentiometer 22 in Fig. 4. For instance, the ring structure may be mounted on the back of panel 59, concentric with and of a size approximately equal to the diameter of the bearing control dials on the front panel as shown in Fig. 2. It may be continuously wound with wire and tapped at three equally spaced points. The arms 23 are then mounted on shaft 63 and rotate with the bug dial 61, contacting the potentiometer winding at their extremities. In this simple case, multiplier resistors 20 and corrective resistors 21 are not necessarily needed.

Terminals 19 are arranged to be connected to the three wire control system used in conjunction with the Selsyn motors which operate the projector-training dial on the echo-ranging gear, and thus the voltages applied to the terminals are as described above. The magnitude of the voltages on the three sections on the potentiometer 22 varies with the bearing at which the echo-ranging gear is being trained. However, in order that "tracking" errors be substantially avoided, and also that potentiometer 22 may be wound with conveniently sized wire, it has been found convenient to break the continuous winding of potentiometer 22, and use the circuit as shown in Fig. 4. Thus, resistors 20 are utilized to prevent drawing an undue amount of current from the Selsyn system and resistors 21 serve to reduce the "tracking" errors inherent in the ring potentiometer arrangement.

In either case, the target bearing bug dial 61 on the panel is so arranged that when the bug indicates the same bearing as is shown on the projector-training dial of the echo-ranging gear, the voltages in the potentiometer windings are such that the arms 23 are resting directly on a null point in the Selsyn circuit, and maximum intensity of the simulated echo is observed as described above.

This arrangement comparing the alignment of the projector-training mechanism with that of the bug dial 61 is one having broad application, as for example, wherever the angular alignments of any two rotating members is to be compared or coordinated. In this case, one (the input shaft) of the members whose angular alignment is to be compared, would be driven by a Selsyn motor in the manner of the projector-training mechanism, while the other member (the output or balancing shaft) would correspond to the shaft 63 on which arms (corresponding to arms 23) would be mounted for contact with the potentiometer. Thus by measuring the potential across the two arms, the angular displacement between the two members could be determined.

Figure 3:
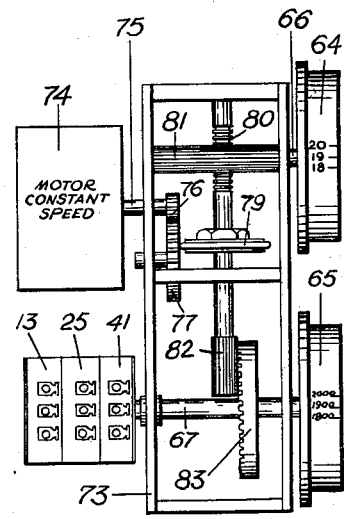
Figure 3 is a diagrammatic view of one form of control for the range and range rate controls.

In order to accommodate the output attenuator 13, the voltage divider 25, and the variable resistor 41, it has been found convenient to mount them on a single shaft by means of which they are driven as a unit by a small motor, as is shown in Fig. 3. A frame 73 is mounted on the back of panel 59 and is designed to support the range rate dial 64 and the range dial 65 on shafts 66, 67, respectively, as described. A small constant speed motor 74 (which may be driven by any convenient source of power) is also mounted on the frame to drive a shaft 75 to which is keyed a small gear 76. Gear 76 drives a combination spur gear and friction disk 77. Another shaft 78 is mounted to extend at right angles to shafts 66, 67 and to slide in the frame 78. It carries a friction wheel 79 which is driven by the disk 77 and a circular rack 80, which engages a pinion 81 fixedly mounted on shaft 66. On the opposite end of shaft 78 is a pinion gear 82 positioned to engage a crown gear 83 fixed to shaft 67. Attenuator 13, voltage divider 25 and variable resistor 41 are all mounted on shaft 67 and are thus varied by the rotation of the shaft.

Since dial 65 is the range dial, its particular setting determines the time interval elapsing between the pulse received at terminals 31 and the signal introduced into the modulator tubes through conductor 18. As has been explained, this is proportional to the range, and the delay is determined by the particular setting of the resistor 41. Likewise, since the intensity of the simulated echo decreases as the range increases, it is necessary to change attenuator 13 in a manner such that as the delay time is increased, the intensity of the echo signal is decreased. In a very similar manner, and as the delay time increases, the setting of voltage divider 25 is also changed to increase the sensitivity of tube 27, which effectively decreases the width of the null on potentiometer 22 (and thus causes the simulated echo to occur over a narrower sector of beam sweep, as represented by the rotation of arms 23). Thus, the target, as its simulated range increases, appears to decrease in width, as would be the case in actual practice.

In order that the range or delay time will decrease in order to simulate a closing range between the target and searching ship, these three controls are automatically caused to vary as motor 74 rotates. As is obvious, in Fig. 3, the rotation of the motor produces this through the gear train comprising shaft 75, gear 76, gear 77, friction wheel 79, shaft 78, gear 82, gear 83 and shaft 67. It may also be manually controlled by rotation of dial 65 which extends through the front panel, as shown in Fig. 1.

The rate at which the motor 74 varies the three controls may be manually controlled by range rate dial 64. Rotation of this dial causes friction wheel 79 to move radially on friction disk 77, through the train comprising shaft 66, pinion 81, and circular rack 80. Since rack 80 is formed circularly, the setting of range rate dial 64 may be changed while the motor 74 and the gear train are in operation.

The remaining controls on panel 59 are used to control the characteristics of the simulated echo. Knobs 68, 69 and 70 are connected to control variable resistor 51, amplitude control 16 and dual potentiometer 4, respectively. Thus, by means of these knobs the duration, amplitude and frequency (Doppler) of the simulated echo signal may be varied as desired.

*Operation of the invention*

In operation, the invention is connected by means of the switch 71 to the echo-ranging gear. As soon as that gear begins operation, or begins to ping, relay 32 is closed momentarily during the pings, and after intervals of time determined by the setting of the range rate dial 64 and range dial 65 (which control variable resistor 41), the modulator tubes 10, 11 are biased to pass the signal generated in the generator section, if arms 23 are properly positioned on potentiometer 22, as at or near a null point.

This latter provision, of course, is fulfilled only if the operator of the echo-ranging gear is training his projector and receiver in a direction (as evidenced by the projector-training dial on the echo-ranging gear) corresponding to that of the setting of the bug dial 61 on the invention. If the operator is training in that direction (or very near it) arms 23 will be positioned at or near a null point and the control exerted on the modulator tubes 10, 11 by the bearing control section of the circuit will allow the simulated echo signal to be applied to the audio stages of the echo-ranging gear. If the echo-ranging gear is trained exactly to the bearing as determined by bug dial 61, the signal passed to the audio stages will be at a maximum; but as the null is departed from, tube 27 exerts more and more control, such attenuation continuing until there is no transmission of the signal by the modulator tubes 10, 11.

In practice, the instructor will set the target bearing bug dial 61 to a given bearing and will also set range dial 65 to a position causing the echo delay to correspond to some given range. Likewise, he will set the range rate dial 64 at some position to simulate a particular rate of closing range (thus the ping and simulated echo occur closer and closer together as the problem progresses).

The student will, of course, begin to train the echo-ranging gear's projector, searching for the "target." When he hears the simulated echo, he knows that he is training in a direction corresponding to the setting of bug dial 61, and may thus direct the conning of the ship towards the target. As the problem goes on, he will note several things: (1) that the range is closing i. e., the simulated echo follows more and more closely the outgoing ping, (2) the signal will be attenuated less and less as the range closes, and (3) the effective target width (i. e., the sector over which the simulated echo is heard) increases as the range closes. Each of these effects is produced by the motor driving variable resistor 41, attenuator 13, and voltage divider 25, respectively.

At any time during the problem, the instructor may: (1) change the setting of the bug dial 61 and force the student to search for the echo at a new bearing (this might be done to simulate the turning of the ship or motion of the target), (2) change the setting of the range rate dial 64 to simulate changes in relative velocity between target and searching ship, (3) change the setting of the range dial 65 (if he feels the automatic variation of range accomplished through the motor driven variable resistor 41 is not sufficient), or (4) alter the characteristics of the simulated echo signal, either as to duration (by means of knob 68), as to amplitude (by means of knob 69), or as to frequency (by means of knob 70). This latter effect produces the effective variation of echo frequency actually observed (because of the well-known Doppler effect) when the target moves relative to the searching ship.

The various controls may be altered as described above to simulate very accurately the phenomena met in practice during the search for and attack against targets. The invention provides simple and effective means for accomplishing this useful purpose and thus makes continuous training of sound operators possible.

As has been stated the operation of the invention in no way interferes with normal operation of the echo-ranging gear, as it merely injects a simulated echo into the audio stages of the existing gear. In other words, all information normally available to the operator about targets, water noise, reverberation and other noises in the surrounding water is still presented to him. If, for instance, he finds more than one target echo (which he will do if there is any real target in the vicinity), the invention may be immediately disconnected by means of switch 71, and normal echo-ranging procedure adopted.

*Screw noise circuit*

It may be convenient to introduce into the invention, in addition to those elements which have been described above, an electrical circuit for providing noises simulating the turning of the screws or propellers of a nearby vessel.

The scope of use of the invention is somewhat broadened in such case, as it then may be used to practice listening as well as echo-ranging. Also, as is obvious, screw noises are heard during the operation of echo-ranging gear and the addition of such a circuit simulates even more closely the conditions met when actual targets are concerned.

As a consequence, Fig. 5 is included to illustrate a type of circuit which may be added to that shown in Fig. 4, and which will produce signals simulating screw noises. If used in conjunction with the circuits of Fig. 4, the same power supply and connections to ring potentiometer 22 and transformer 24 may be used.

In Fig. 5, the noise is generated in a thyratron tube 84 which is operated continuously to generate random noise. The noise is coupled off the plate of tube 84 through a condenser to tube 85. This tube modulates the signal to obtain an effect which simulates the beating or throbbing of propellers. The modulation is accomplished by varying the voltage applied to the screen of tube 85 by means of an oscillator 86, which conveniently may be dual triode. As shown in Fig. 5, the tube 86 produces a sinusoidal modulation of the signal in tube 85. This has been found more convenient and useful than a sawtooth modulator which might also be utilized. In such case, a gas tube, operating as a sawtooth oscillator, could be used in place of tube 86.

Dual potentiometer 87 and condensers 88, 89 determine the frequency of oscillation of tube 86, much in the manner that the dual potentiometer 4 and condensers 2, 3 controlled the frequency of oscillation of generator tube 1 in Fig. 4, except that the Wien bridge arrangement is not used. The particular frequency of oscillation simulates the particular variation of actual propeller noise, as determined by the R. P. M. of the propeller shaft.

The signal, as modulated by tube 85, may be conveniently shaped by means of a band-pass filter 87, which alters the signal in a manner similar to that which would take place were actual screw noises received, amplified and filtered by the echo-ranging gear.

The output of the filter is fed to the output tube 88, which conveniently may be a single pentode. This tube supplies the primary winding 89 of an output transformer, which may simply be another primary winding of transformer 12 of Fig. 4. Amplitude control 90 determines the intensity or amplitude of the simulated screw noise which is applied to the winding 89 of the output transformer, in a manner similar to that of amplitude control 16 in Fig. 4.

The grid of pentode 91 receives control voltage from the arm of voltage divider 25 through isolating resistor 92, to accomplish the same kind of bearing control as is performed by the bearing control section of Fig. 4. Thus, tube 91 supplies control to modulator tube 88 through conductor 93 in a manner analogous to the control supplied to modulator tubes 10, 11 in the output section of Fig. 4.

Since the screw noise of a ship or submarine will have a bearing slightly offset from the average echo bearing because the screws are at the stern of the vessel, it is convenient to offset the screw noise null through a small angle with respect to the echo null. This is accomplished by potentiometer 94, which is supplied from a convenient source of low alternating potential of the same frequency and phase as that utilized in the Selsyn system.

As was done in the case of the circuits shown in Fig. 4, it is most convenient to mount the controls which alter the characteristics of the screw noise on the front panel 59 of the invention. Although, this is not illustrated in the drawings, convenient means will be obvious to those skilled in the art. Thus, dual potentiometer 87 (controlling the simulated frequency variation of the screws), amplitude control 90 (controlling the intensity of screw noise) and the potentiometer 94 (controlling the angle through which the screw noise null is offset from the simulated echo signal null) would be controlled by means of knobs on the front panel 59, arranged in a manner similar to those controlling the simulated echo, as shown in Fig. 1.

As used in the claims, the term "potentiometer" is intended to include potentiometers, rheostats, voltage dividers, attenuators and variable resistors.

Having described the invention, we claim:

1. A training device for use with echo-ranging gear including a trainable transducer, said device comprising: an oscillator for generating a signal simulating the echo signal reflected by a target; adjustable bearing indicator means; and means for applying said signal to the receiver of said gear only when said transducer is trained in a direction corresponding to the setting of said indicator means, said means comprising a grid bias control in circuit with said oscillator and controlled jointly by said bearing indicator means and said transducer.

2. A training device for use with echo-ranging gear comprising: means for generating a signal; delay means for applying said signal to the receiver of said gear initially at a preselected interval after said gear transmits a ping to thereby simulate receipt of an echo of said ping from a target; and means for varying said interval at a selected rate to thereby simulate changes in target range.

3. In the device described in claim 2, said last mentioned means comprising a motor controlled impedance.

4. In the device described in claim 2, said last mentioned means comprising a motor driven potentiometer.

5. In the device described in claim 2, means for varying the rate at which said interval is varied.

6. The combination in claim 2 characterized by the fact that said signal generating means comprises an oscillator and said delay means comprises a grid bias control in circuit with the output of said oscillator.

7. A training device for use with echo-ranging gear including a trainable transducer, said device comprising; an oscillator for generating a signal simulating the echo signal reflected by a target; means for applying said signal to the receiver of said gear initially at a preselected interval after said gear transmits a ping to thereby simulate receipt of an echo of said ping from a target; means for varying said interval at a selected rate to thereby simulate changes in target range; adjustable bearing indicator means, and means for preventing application of said signal to the receiver of said gear except when said transducer is trained in a direction corresponding to the setting of said indicator means, last said means comprising a grid bias control in circuit with said oscillator and controlled jointly by said bearing indicator means, said transducer and said means for varying said interval.

8. In a device to determine bearings with an echo-ranging gear having a training mechanism, said device comprising: a follow-up means driven by the training mechanism of the echo-ranging gear; a potentiometer provided with a closed endless winding; a source of alternating voltage connected to the input of said follow-up device; electrical connections between the output of said follow-up device and spaced points on said potentiometer winding whereby a line drawn through substantially diametrically-opposite points on said winding between which a zero potential exists indicates the direction assumed by the training mechanism; a shaft; a pair of arms adapted to selectively contact diametrically-opposite portions on said potentiometer winding; said arms extending radially of and controllable by said shaft whereby the potential between any pair of diametrically-opposite points on said potentiometer can be measured, the magnitude of said latter potential with respect to said zero potential being indicative of the relative angular displacement between the training mechanism and said shaft.

9. In the device described in claim 8, means for indicating substantially zero potential.

10. A training device for use with an echo-ranging gear having means for transmitting a signal and having a receiver, said training device comprising means for generating a signal, delay means for applying said signal generated by said generating device to the receiver of said gear at a predetermined time after said gear transmits a signal, and switch means operably connected to said delay means, said switch means being actuated in response to a signal transmitted by said echo-ranging gear to actuate said delay means.

11. A training device for use with echo-ranging gear having means for transmitting a ping and having a receiver, said device comprising signal generating means for generating a signal, means for applying said signal to the receiver of said gear initially at a selected interval after said gear transmits a ping, means for varying said interval, means for varying the intensity of said signal, and means for simultaneously actuating said last two mentioned means whereby the intensity of the signal is varied with the time length of said interval.

12. In the device described in claim 11, said last-mentioned means comprising a motor-controlled impedance.

13. In the device described in claim 11, said last-mentioned means comprising a motor-driven potentiometer.

14. A ranging device for use with trainable echo-ranging gear having an energy-generating means and having a receiver, said device comprising means for indicating a selected direction, means for generating a signal simulating the echo signal reflected by a target, means for generating a second signal simulating the sounds produced by a vessel, means actuated by energy from said gear for applying said signals to the receiver of said gear, and control means operatively conected to said indicating means to prevent such application of said signals to said receiver except when said gear is trained substantially in the selected direction.

15. A training device for use with a trainable echo-ranging gear having a receiver, said device comprising means for indicating a selected direction, means for generating a signal simulating the sounds produced by a vessel, means for applying said signal to the receiver of said gear, and control means operatively connected to said indicating means to prevent such application of said signal to said receiver except when said gear is trained in a direction corresponding substantially to the selected direction.

References Cited in the file of this patent

UNITED STATES PATENTS

| | | |
|---|---|---|
| 1,939,706 | Karnes | Dec. 19, 1933 |
| 2,254,159 | Sperti | Aug. 26, 1941 |
| 2,321,799 | Cone | June 15, 1943 |
| 2,432,772 | Lear | Dec. 16, 1947 |